(12) United States Patent
Loukianov et al.

(10) Patent No.: US 7,587,091 B2
(45) Date of Patent: Sep. 8, 2009

(54) DE-INTERLACING USING DECODER PARAMETERS

(75) Inventors: Dmitrii Loukianov, Chandler, AZ (US); Raju Hormis, New York, NY (US)

(73) Assignee: Intel Corporation, Santa Clara, CA (US)

( * ) Notice: Subject to any disclaimer, the term of this patent is extended or adjusted under 35 U.S.C. 154(b) by 778 days.

(21) Appl. No.: 10/976,460

(22) Filed: Oct. 29, 2004

(65) Prior Publication Data

US 2006/0093228 A1 May 4, 2006

(51) Int. Cl.
- G06K 9/46 (2006.01)
- G06K 9/36 (2006.01)
- G06K 9/40 (2006.01)
- H04N 7/12 (2006.01)
- H04N 11/02 (2006.01)
- H04N 11/04 (2006.01)
- H04N 7/01 (2006.01)

(52) U.S. Cl. .................. 382/239; 382/236; 382/250; 382/261; 382/265; 375/240.16; 375/240.14; 375/240.01; 348/452; 348/448

(58) Field of Classification Search ........... 382/232, 382/236, 239, 250, 261, 265; 375/240.01, 375/240.02, 240.14, 240.16, 240.2, 240.24; 348/448, 452

See application file for complete search history.

(56) References Cited

U.S. PATENT DOCUMENTS

| | | | | |
|---|---|---|---|---|
| 4,517,602 A | * | 5/1985 | Murphy et al. | 348/738 |
| 5,454,051 A | * | 9/1995 | Smith | 382/233 |
| 5,796,437 A | * | 8/1998 | Muraji et al. | 348/452 |
| 6,363,115 B1 | * | 3/2002 | Doux | 375/240.16 |
| 6,414,718 B1 | * | 7/2002 | McDonald et al. | 348/448 |
| 6,590,934 B1 | * | 7/2003 | Kim | 375/240 |
| 6,748,113 B1 | * | 6/2004 | Kondo et al. | 382/232 |
| 6,873,368 B1 | * | 3/2005 | Yu et al. | 348/441 |
| 6,990,151 B2 | * | 1/2006 | Kim et al. | 375/240.27 |
| 7,042,512 B2 | * | 5/2006 | Yang et al. | 348/452 |
| 7,079,190 B2 | * | 7/2006 | Chow | 348/448 |
| 7,095,787 B2 | * | 8/2006 | Kadono et al. | 375/240.27 |
| 7,113,221 B2 | * | 9/2006 | Law et al. | 348/448 |
| 7,349,028 B2 | * | 3/2008 | Neuman et al. | 348/448 |
| 2002/0047919 A1 | * | 4/2002 | Kondo et al. | 348/441 |
| 2004/0066466 A1 | * | 4/2004 | MacInnis et al. | 348/451 |
| 2005/0135699 A1 | * | 6/2005 | Anderson | 382/261 |
| 2005/0180654 A1 | * | 8/2005 | Zhu | 382/269 |
| 2005/0253963 A1 | * | 11/2005 | Wong | 348/452 |
| 2007/0229534 A1 | * | 10/2007 | Kim et al. | 345/606 |

\* cited by examiner

*Primary Examiner*—Matthew C Bella
*Assistant Examiner*—Michael A Newman
(74) *Attorney, Agent, or Firm*—Blakely, Sokoloff, Taylor & Zafman LLP

(57) ABSTRACT

Locations of reference blocks of pixels of decoded interlaced video reference fields decoded from a compressed stream of video data are computed using motion vectors decoded from the same stream of video data. The reference block computed locations are de-interlaced with current blocks from current video fields decoded from the compressed streams of video data by low pass filtering light intensities of adjacent pixels of the reference and current blocks using low pass filter with coefficients adjustable according to discrete cosine transform (DCT) high frequency coefficients decoded from the coded stream. In addition, moving edges or objects of the de-interlaced blocks of pixels can be identified by comparing the decoded motion vector of the reference blocks to a threshold value. Then proper or more appealing light intensities for the moving edge pixels can be interpolated.

5 Claims, 6 Drawing Sheets

DE-INTERLACING USING DECODER PARAMETERS

BACKGROUND

1. Field

De-interlacing of interlaced fields of digital video.

2. Background

Compressed or coded digital video is quickly becoming ubiquitous for video storage and communication. Generally speaking, video sequences contain a significant amount of statistical and subjective redundancy within and between frames. Thus, video compression and source coding provides the bit-rate reduction for storage and transmission of digital video data by exploiting both statistical and subjective redundancies, and to encode a "reduced set" of information using entropy coding techniques. This usually results in a compression of the coded video data compared to the original source data. The performance of video compression techniques depends on the amount of redundancy contained in the image data as well as on the actual compression techniques used for coding. For example, video compression or coding algorithms are being used to compress digital video for a wide variety of applications, including video delivery over the Internet, digital television (TV) broadcasting, satellite digital television, digital video disks (DVD), DVD players, set top boxes, TV enabled personal computers (PC), as well as video storage and editing.

The performance of modern compression algorithms, such as moving picture experts group (MPEG) (e.g., such as MPEG2 (ISO/IEC 13818-2:2000, published 2000) or MPEG4 (ISO/IEC 14496-3:2000, published 2004)), can often reduce raw video data rates by factors of 15 to 80 times without considerable loss in reconstructed video quality. The basic statistical property upon which MPEG compression techniques rely is inter-pel correlation, including the assumption of simple correlation translatory motion between consecutive frames. Since video sequences usually contain statistical redundancies in both temporal and spatial directions, it is assumed that the magnitude of a particular image pel can be predicted from nearby pixels within the same frame (using intra-frame coding techniques) or from pixels of a nearby frame (using inter-frame techniques). It is clear that in some circumstances, such as during scene changes of a video sequence, the temporal correlation between pixels and nearby frames is small or even disappears (e.g., the video scene is then an assembly over time of uncorrelated still images). In such cases, intra-frame coding techniques are appropriate to explore spatial correlation to achieve sufficient data compression.

MPEG compression algorithms employ discrete cosine transform (DCT) coding techniques on image blocks of 8×8 pixels to effectively explore spatial correlations between nearby pixels within the same image. However, if the correlation between pixels in nearby frames is high, such as where two consecutive frames have similar or identical content, it is desirable to use inter-frame coding techniques employing temporal prediction, such as motion compensated prediction between frames. MPEG video coding schemes use an adaptive combination of both temporal motion compensated prediction followed by a transform coding of the remaining spatial information to achieve high data compression. For example, digital video is often compressed in 4×4 or 8×8 blocks of pixels using motion-compensated (MC) prediction combined with the DCT block transform. The video encoder codes the prediction coefficients (motion vectors, frame field, MC decision, direction, etc.) as well as the DCT coefficients into the compressed bit-stream. The decoder then uses these parameters to decode and reconstruct the video. For example, the DCT coefficients, MC mode, and motion vectors may be used to reconstruct pixels from decoded fields of interlaced video data. The reconstructed video fields are then passed through a de-interlacer to form frames, when the decoded video is to be displayed by a non-interlace display technology.

BRIEF DESCRIPTION OF THE DRAWINGS

Various features, aspects and advantages will become more thoroughly apparent from the following detailed description, the set of claims, and accompanying drawings in which:

DETAILED DESCRIPTION

Figure 1:
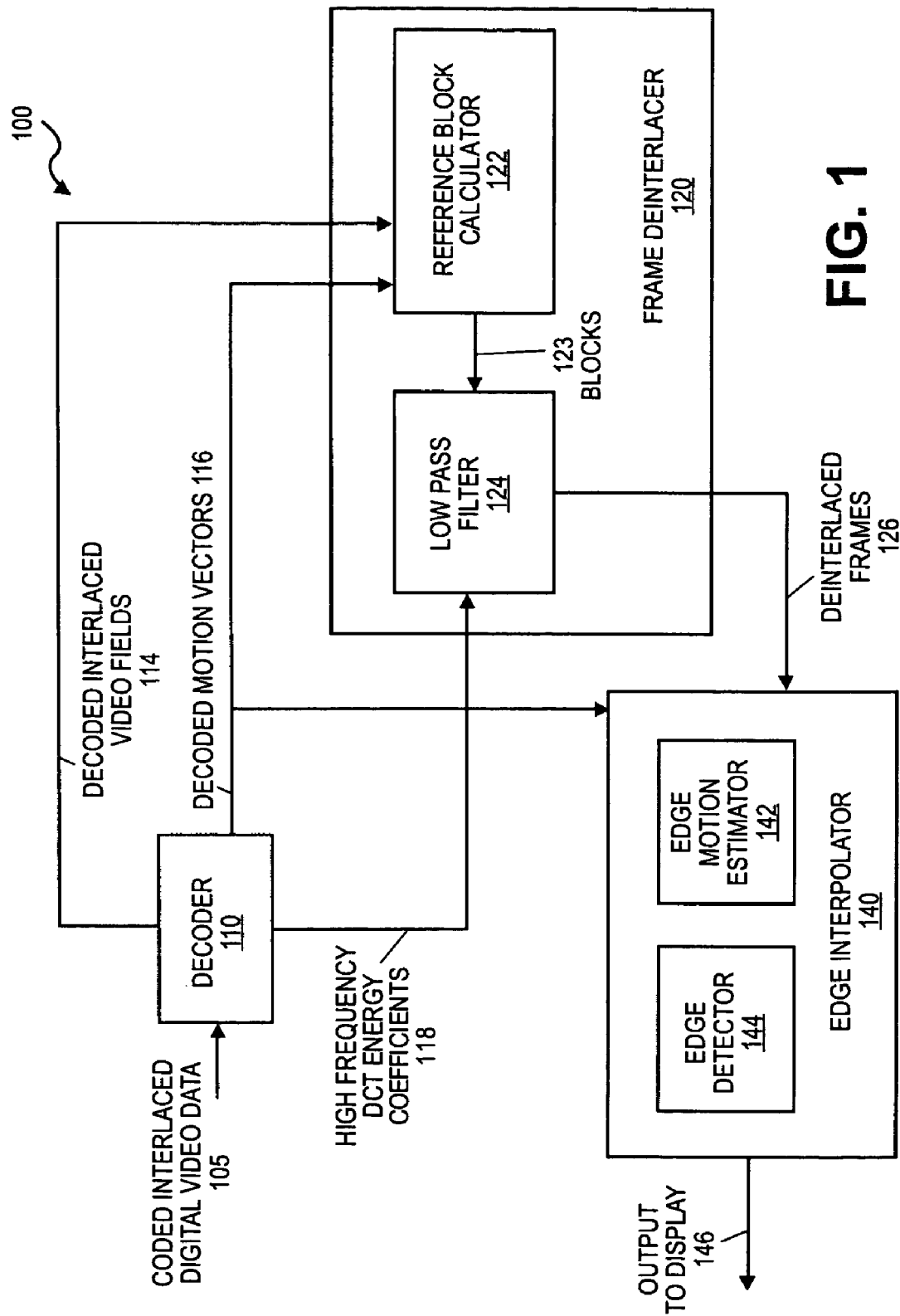
FIG. 1 is a system for de-interlacing using decoded parameters of digital video, in accordance with one embodiment.

Coded digital video typically includes parameters or prediction coefficients such as motion vectors, frame-field MC decisions, directions, as well as the DCT coefficients, in a compressed or coded bit-stream. For instance, motion picture experts group (MPEG) (e.g., such as MPEG2 (ISO/IEC 13818-2:2000, published 2000) or MPEG4 (ISO/IEC 14496-3:2000, published 2004)) or other digital video may be compressed or coded in 4×4 or 8×8 blocks of pixels using motion compensated (MC) prediction combined with discrete cosine transform (DCT) block transforms. De-interlacing of video decoded from coded or compressed digital video is desired when the decoded video is in interlaced format, while the actual video display uses a progressive format. Progressive format displays include PC monitors, liquid crystal displays, high definition TV, or other technology that requires records, or video stream that is not interlaced, such as a stream having 60 progressive full frames of video information per second. On the other hand, interlaced video is a technology that records or transmits 60 fields per second, where each fields include data of approximately half a frame. Thus, two consecutive fields of interlaced data include data of one frame and a stream of interlaced video includes, in 60 fields per second, only 30 frames of information per second.

De-interlacing of video is a process of spatial-temporal interpolation of the data of two fields to form one frame. However, since there is a time difference between each field of data, it is not sufficient to simply combine two fields to form a frame, as objects that are moving may be in a different position in one field than in another. For example, a first field having every odd line of image information of a ball flying through the air combined with a subsequent field having every even line of image of the ball flying through the air will provide a ball having edges that have "sawtooth" edge distortion, "mice teeth", "stair-case" patterns, "combing", serations, or interlaced lines extending to different end points. Specifically, all of the image lines for the edge of the ball from the subsequent field will be ahead of the image lines for the edge of the ball in the previous field. Thus, the de-interlacing of video may be performed by spatio-temporal interpolation of one field of interlaced video data with a subsequent field of interlaced video data, and can be done in the direction of optic flow of the elements in a scene.

In accordance with embodiments, a decoder may use MC prediction parameters decoded from a compressed or coded digital video stream to reconstruct the interlace video fields from the coded interlaced video stream, to de-interlace the decoded fields into frames, and to identify proper edges of moving objects in the de-interlaced frames. It is possible to take advantage of decoded MC prediction parameters, such as motion vectors, MC mode, and DCT coefficients, to perform "motion compensated de-interlacing" by de-interlacing motion compensated blocks of fields using a low pass filter having adjustable coefficients (e.g., such as gain coefficients), and to provide or interpolate more appealing edges of moving objects in the de-interlace frames.

For instance, FIG. 1 is a system for de-interlacing using decoded parameters of digital video, in accordance with one embodiment. FIG. 1 shows system 100 having decoder 110 receiving coded interlaced digital video data 105 and coupled to frame de-interlacer 120. Edge interpolator 140 is coupled to decoder 110 and frame interlacer 120, and transmits output to display 146.

Decoder 110 may be a hardware decoder and/or include software sufficient to decode coded interlaced digital video data 105 and produce decoded interlaced video fields 114, decoded motion vectors 116, and high frequency DCT energy coefficients 118. For example, decoded interlaced video fields 114 may be consecutive interlaced video fields of data produced from DCT coefficients, MC mode, motion vector, and motion compensation information decoded from data 105. Decoded motion vectors 116 may be motion vectors associated with blocks, such as 4×4 or 8×8 blocks of pixels, within fields 114. Likewise, high frequency DCT energy coefficients 118 may be information or magnitudes related to one or more high frequency DCT coefficients related to video fields 114 and/or blocks of pixels thereof.

Decoder 110 may decode motion vectors coded into data 105, where each motion vector was pre-computed at a video encoder by comparing a block of pixels of a current frame of pixels to blocks in previous reference frames. In some cases, the reference frames may occur after, rather than before, the current frame. In other cases, the reference frame may not be adjacent to the current frame. Irrespective of the location of the reference frame, all motion vectors, by definition, point to the current block of pixels in the current frame. Hence, the motion vectors can be used directly to obtain a block of temporal reference pixels, which are used by the de-interlacer.

According to embodiments, while deinterlacing a given block of pixels, decoder 110 or frame interlacer 120 may set the motion vector corresponding to the given block to zero if a coded motion vector for it does not exist in the decoded bit-stream. Alternatively, the motion vector of the spatially nearest block may be copied directly.

FIG. 1 shows frame de-interlacer 120 including reference block calculator 122 coupled to decoder 110 and low pass filter 124. Low pass filter 124 is coupled to decoder 110 and edge interpolator 140. Calculator 122 may send motion compensated reference blocks of data to low pass filter 124 via blocks 123.

For example, frame de-interlacer 120 may be an adaptive de-interlacer to form de-interlaced frames 126 from decoded interlaced video fields 114. Specifically, calculator 122 may motion compute, calculate, compensate, move, or adjust a location of a reference block of pixels within a reference field received from fields 114 according to a motion vector (e.g., such as according to the motion vector for the reference block location in the reference field as compared to the location of the corresponding block in the previous field received from vectors 116). In addition, calculator 122 may receive a current block of pixels of a current field from fields 114. According to embodiments, adaptive de-interlacer 120 may also include a motion vector extractor to extract motion vectors 116 of blocks of data, a decoder to decode high frequency DCT energy coefficients 118 from DCT coefficients for fields 114, a map constructor to construct a map of motion vectors 116 of blocks of data for fields 114, and a pixel block selector for selecting blocks of pixels (e.g., such as pixel block 312 of FIG. 3) of fields 114 to be processed by adaptive frame de-interlacer 120 according to motion vectors 116 and high frequency DCT energy coefficients 118. For example, the DCT coefficients may be decoded from codes in data 105.

Thus, low pass filter 124 may receive a current block of pixels and a motion compensated reference block of pixels from calculator 122 by blocks 123. Low pass filter 124 may then low pass filter the current block and the motion compensated reference block to provide to edge interpolator 140, de-interlaced block of de-interlaced frames 126. For example, low pass filter 124 may have coefficients that are adjustable depending on the magnitude of the high-frequency DCT energy coefficients 118. Thus, the coefficients for low pass filtering to de-interlace the current block and motion compensated reference block may be affected or adjusted according to the magnitude of the high frequency DCT coefficients of the current block.

Edge interpolator 140 receives de-interlaced frames 126 from low pass filter 124 and identifies diagonal edges of moving objects in blocks of de-interlaced frames 126. Edge interpolator 140 also interpolates or identifies proper edge pixels (e.g., such as more appealing edge pixels when viewed by a viewer) of the diagonal edges of the moving object detected. In some cases, edge interpolator averages out or "fuzzes" the light intensity of moving edge pixels of a de-interlaced frame to reduce "stair case" or "combing" at those edges.

Edge interpolator 140 is shown in FIG. 1 including edge detector 144 and edge motion estimator 142. Edge detector 144 finds edges, such as diagonal edges of objects or blocks of pixels in de-interlaced frames 126. Edge motion estimator 142 detects or identifies moving objects, moving edges, or blocks of pixels having moving objects or edges in de-interlaced frames 126. Where moving edges are detected, edge interpolator 140 outputs proper edge pixels of diagonal edges of moving objects and outputs the properly edge identified de-interlaced frames at output to display 146.

It is contemplated that deinterlacer 120, edge interpolator 140, and/or components thereof may be embodied in software instructions or a machine-accessible medium containing such instructions. In addition, deinterlacer 120 and edge interpolator 140 may be part of a digital TV, or computer system having a processor and a memory for storing instructions, such as those described above, to be executed by the processor.

Figure 2:
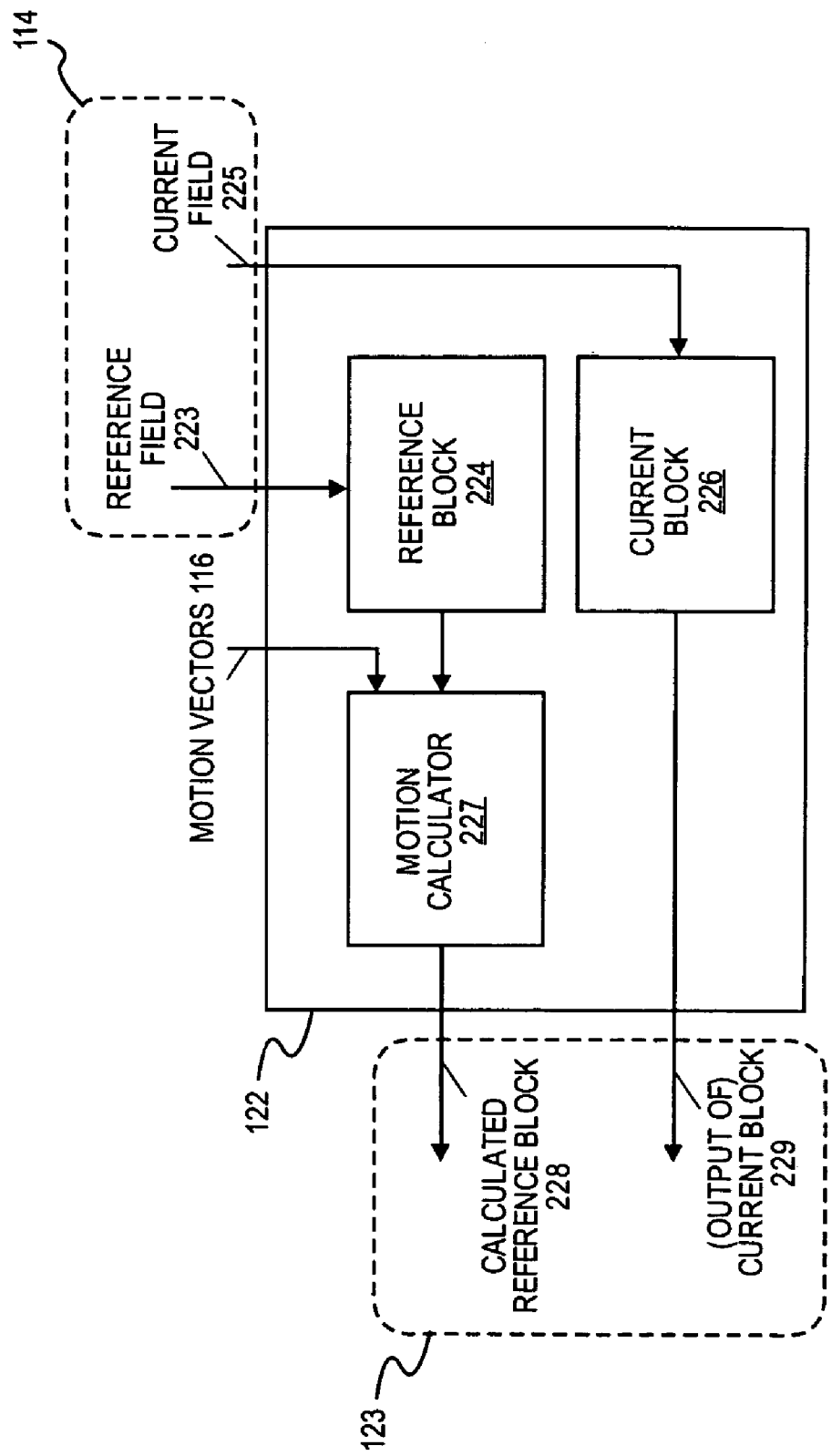
FIG. 2 is a block diagram of a reference block calculator in accordance with one embodiment.

FIG. 2 is a block diagram of a reference block calculator in accordance with one embodiment. FIG. 2 shows reference block calculator 122 having reference block 224 receiving reference field 223, current block 226 receiving current field 225, and motion calculator 227 receiving motion vectors 116 and the output of reference block 224. Reference field 223 and current field 225 are two fields from the sequence of decoded interlaced fields in 114. Typically, it is expected that both reference block 224 and current block 226 will include all or a portion of the same set of pixels, albeit from different fields of interlaced data. In other words, the reference block and current block may have pixels in common (e.g., such as a moving set of pixels in common). Calculator 122 outputs output of current block 229 from current block 226 and motion compensated reference block 228 from motion calculator 227. It is contemplated that block 228 and block 229 may provide blocks 123 to low pass filter 124.

Thus, motion calculator 227 may calculate, compute, move, compensate, or adjust a location of reference block 224 of pixels from reference field 223 according to motion vectors 116. It can be appreciated that the compensation by motion calculator 227 may be with an eye towards to adjusting the locations of moving objects or images in reference blocks with respect to the current block in order to reduce staircasing or combing at the edge of moving objects or images.

Figure 3:
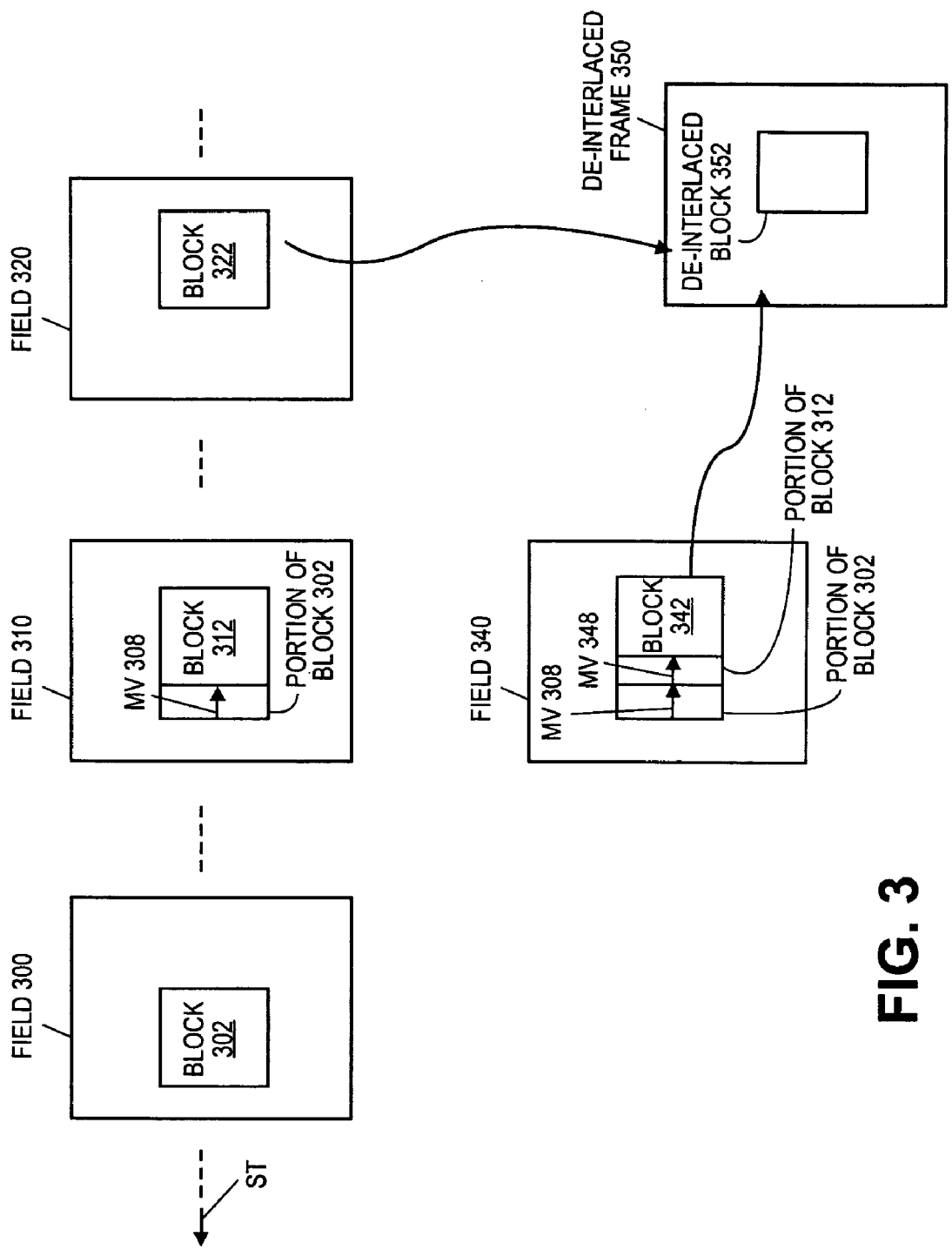
FIG. 3 shows fields of interlaced video data having blocks of data for de-interlacing into a frame.

For example, FIG. 3 shows fields of interlaced video data having blocks of data for de-interlacing into a frame. FIG. 3 shows field 300, field 310, and field 320, which may be successive fields of interlaced data in a stream of decoded fields of interlaced data decoded from coded interlaced digital video. For example, field 300 may be a field previous to field 310, and field 320 may be a field subsequent to field 310 in stream of decoded fields ST. Block 322 may be a block that when combined with block 312 forms de-interlaced block 352 of de-interlaced frame 350. It can be appreciated that stream of decoded fields ST (e.g., fields 300, 310, and 320) may be successive or non-successive fields of interlaced video fields 114.

Field 300 is shown having block 302 of pixels, field 310 is shown having block 312 of pixels, and field 320 is shown having block 322 of pixels. Field 340 may be one field of frame 350 that needs to be deinterlaced. Let motion vector MV348 be a vector that shows the translation of block 342 from field 320 to field 340. By definition, the translation of block 342 in field 340 is block 322 in field 320. Now, the location of two other blocks, blocks 302 and 312, can be identified by "re-using" motion vector MV348 by extending the motion vector. Here, extending motion vector MV348 to provide the location of blocks 302 and 312, is considered "re-using" the motion vector since the motion vector is also used to translate the location of block 342.

According to embodiments, motion calculator 227 finds the location of block 312 in field 310 by continuing or increasing the movement of block 312 in the direction of the vector component of motion vector MV348, and with a magnitude of all or a portion of the magnitude of motion vector Mv348. Alternatively, if a separate motion vector, say motion vector Mv308 exists, then motion vector MV308 can be used directly without any modification, since by definition, motion vector MV308 shows the motion translation between field 340 and field 310.

Whether "re-using" motion vector MV348 or using motion vector MV308, reference block 312 is "fetched" using the motion vector. In addition, reference block 312 may be considered a "motion compensated" reference block, according to the motion vector. Also, reference block 312 may be considered to have a "computed" or "calculated" location, according to the motion vector.

Block 342 of FIG. 3 may include an object, and we would expect that block 322 may include a portion or all of that object. Moreover, all or a portion of the object included in block 312 may also be included in block 302. Naturally, the object of block 312 will be the object of block 342 displaced by motion vector MV348.

According to embodiments, low pass digital filter 124 may include an adaptive video filter to vertically and temporally filter blocks 123, which consists of blocks 228 and 229, to form de-interlaced frames 126 (e.g., such as de-interlaced frames 350 including de-interlaced block 352).

Figure 4:
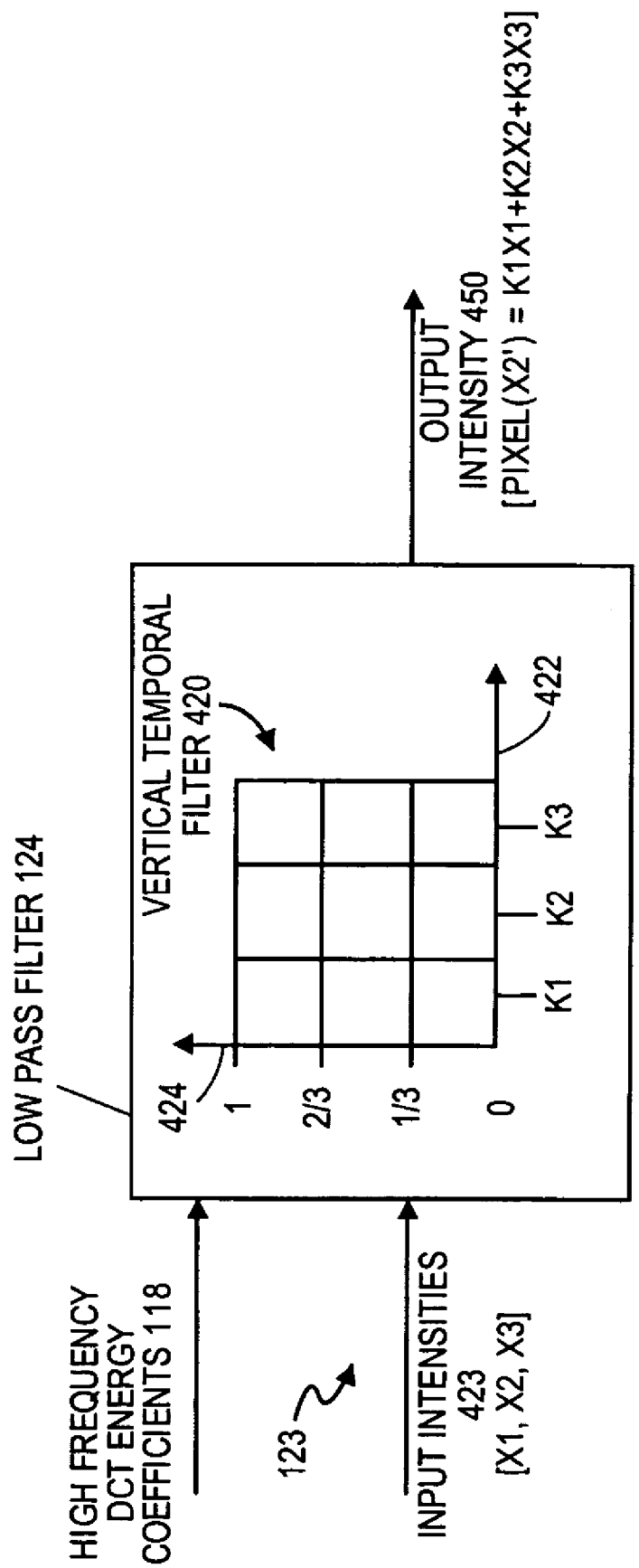
FIG. 4 is a block diagram of a low pass filter for de-interlacing video, in accordance with one embodiment.

In most cases, low pass filter 124 receives motion compensated reference block 228 (e.g., such as block 342 as shown in FIG. 3) and output of current block 229 (e.g., such as block 322 shown in FIG. 3) and forms a de-interlaced block therefrom (such as de-interlaced block 352). For instance, FIG. 4 is a block diagram of a low pass filter for de-interlacing video, in accordance with one embodiment. FIG. 4 shows low pass filter 124 receiving high frequency DCT energy coefficients 118 and blocks 123 and providing output pixel intensity 450. As mentioned above, blocks 123 represents blocks 228 and 229, also known as 322 and 342. Thus, low pass filter 124 may receive input intensities 423 which are illumination or light intensities of pixels of blocks 123, i.e. blocks 228 and 229 also known as blocks 322 and 342, of interlaced fields of pixels. Also, output pixel intensity 450 corresponds to an illumination or light intensity of a pixel to be included in de-interlaced block 352, and/or a pixel intensities of a pixel of de-interlaced frames 126.

For example, according to embodiments, filter 124 may include vertical temporal filter 420 as shown in FIG. 4. Vertical temporal filter 420 is shown having coefficient magnitude axis 424 and coefficient index axis 422. Coefficient magnitude axis 424 has a range between 0 and 1, and coefficient index axis 422 shows coefficients K1, K2, and K3. Although axis 424 has a range between 0 and 1, it can be appreciated that other ranges may be appropriate. Similarly, although axis 422 includes three coefficients, K1-K3, it can be appreciated that more or less coefficients may be used.

Specifically, filter 420 may receive input intensities 423 having intensity X1, X2, and X3 from two or more adjacent or not adjacent fields of interlaced data, and in response provide output pixel intensity 450 for the pixel intensity corresponding to the pixel at X2' of a frame of de-interlaced data equal to K1X1+K2X2+K3X3. Thus, output pixel intensity 450 may be a new or subsequent intensity of a single pixel (e.g., such as an intensity value for a new pixel to be located at the location of X2' in a de-interlaced frame or block) equal to the intensity of a pixel adjacent to X2 from a first field of interlaced data multiplied by K1, plus an intensity of the pixel X2 from a second field of interlaced data multiplied by K2 (e.g., pixel X2 may be at a location in a field of data equal to position X2' in the de-interlaced frame), plus an intensity of another pixel adjacent to X2 from the first field of interlaced data multiplied by K3.

Moreover, X1 through X3 may be aligned vertically so that the value of output pixel intensity 450 of the de-interlaced frame depends on the value of intensity of a pixel above and below the pixel for which output pixel intensity 450 is being calculated. Furthermore, the pixels providing input intensities X1 through X3 may be from different fields of interlaced data (e.g., such as from different fields of fields 114). More particularly, in one example, the value of intensities X1 through X3 of input intensities will be from blocks 123, i.e. block 228 and 229, (also known as block 342 and 322). Thus, the de-interlaced field or block intensity at X2 (e.g., such as calculated for intensity 450) may be from a calculation including pixels of a motion compensated reference block of a field of interlaced data and pixels of a current block of a subsequent field of interlace data. Alternatively, the intensities X1 and X3 of input intensities 423 may be intensities of adjacent pixels from a motion compensated reference block of pixels, and intensity X2 of input intensities 423 may be an intensity of a pixel from a current block of pixels, where during the interlacing of the current block and motion compensated reference block, the pixel having intensity X2 is located between the pixel having intensities X1 and X3. More particularly, intensity X2 of input intensities 423 may be an intensity of a pixel of a motion compensated reference block of pixels, and intensities X1 and X3 may be intensities of adjacent pixels from a current block of pixels. Alternatively, the intensities X1 and X3 of input intensities 423 may be intensities of adjacent pixels from a motion compensated reference block of pixels, and intensity X2 of input intensities 423 may be an intensity of a pixel from a current block of pixels, where during the interlacing of the current block and motion compensated reference block, the pixel having intensity X2 is located between the pixels having intensities X1 and X3.

It is also considered that other numbers of pixels for input intensities 423 or relationship of location within one or more fields for pixels having intensities to be input intensities 423 and output pixel intensity 450 may consider the intensity of pixels from one or more fields temporally adjacent to each other, temporally within three fields of each other, temporally within four fields of each other, etc. Similarly, the intensity of pixels used for input intensities 423 and considered for output pixel intensity 450 may include multiple pixels, such as a number of between two and 20 pixels at locations, around, adjacent to, next to, proximate to, one pixel away from, two pixels away from, or three pixels away from the pixel having intensity X2.

According to embodiments, the bandwidth of low pass filter 124 may be lowered when the high frequency DCT energy coefficients for the reference block increase in magnitude, such as being greater than a selected threshold value; and the bandwidth may be increased when the DCT energy calculations decrease in magnitude, such as by being less than the same or another selected threshold value. Specifically, the low-pass filter 124 may filter block 342 and 322. Therefore, the coefficients of the filter may be adapted based on the DCT coefficients for block 342, which are available through coefficients 118 from the decoder. The DCT coefficients may contain the DCT of the exact difference (pixel-by-pixel subtraction) between block 342 and block 322. If block 342 has the similar pixels as block 322, as it should have by definition, the DCT coefficients will be 0 or very small. However, when noise is present in the video, even if block 342 has the similar pixels as block 322, the low-frequency DCT coefficients will be 0, but the high-frequency coefficients will not. This property allows for adaptation of the filter (e.g., filter 124) coefficients. In other words, this property leads to more accurate deinterlacing based on the fact that motion-estimation can match low and medium-frequency details in blocks, but not noise.

According to embodiments, coefficients K1, K2, and K3 are adjustable depending on at least one decoded high frequency coefficient, such as depending on high frequency DCT energy coefficients 118. In one case, the high-frequency DCT energy is low which implies the lack of noise, and thus the filter can be made all-pass in nature. For instance, K1 and K3 can be set to equal 0, while K2 is set to equals 1. As a result, output pixel intensity 450 for the de-interlaced frame at X2' will simply be the intensity X2 (e.g., such as the same intensity that was originally at the pixel location for X2 in the field of the motion compensated reference block or current block of pixels).

On the other hand, where high frequency DCT energy coefficients 118 are high (e.g., such as due to the presence of noise), K1, K2, and K3 can be set to be all equal (e.g., such as by each being set to one third). This makes the filter take on low-pass behaviour. In this case, the value of the intensity of output pixel intensity 450 for the de-interlaced frame is equal to an average of the pixel intensity of X1, X2, and X3.

Thus, calculator 122 and filter 124 can form de-interlaced frames 126 where each of the de-interlaced frames is de-interlaced frame formed by adjusting coefficients of a low pass filter and filtering pixels of a reference field of pixels (e.g., such as a field including motion compensated reference blocks of pixels) with a current field of pixels provided from fields 114, where the current field is temporally after the reference field, the current field includes a set of pixels of a scene of video content, and the reference field includes at least a portion of that set of pixels. Of course in instances where the reference field and current field do not include related images, de-interlacing may be performed by other processes.

Figure 5:
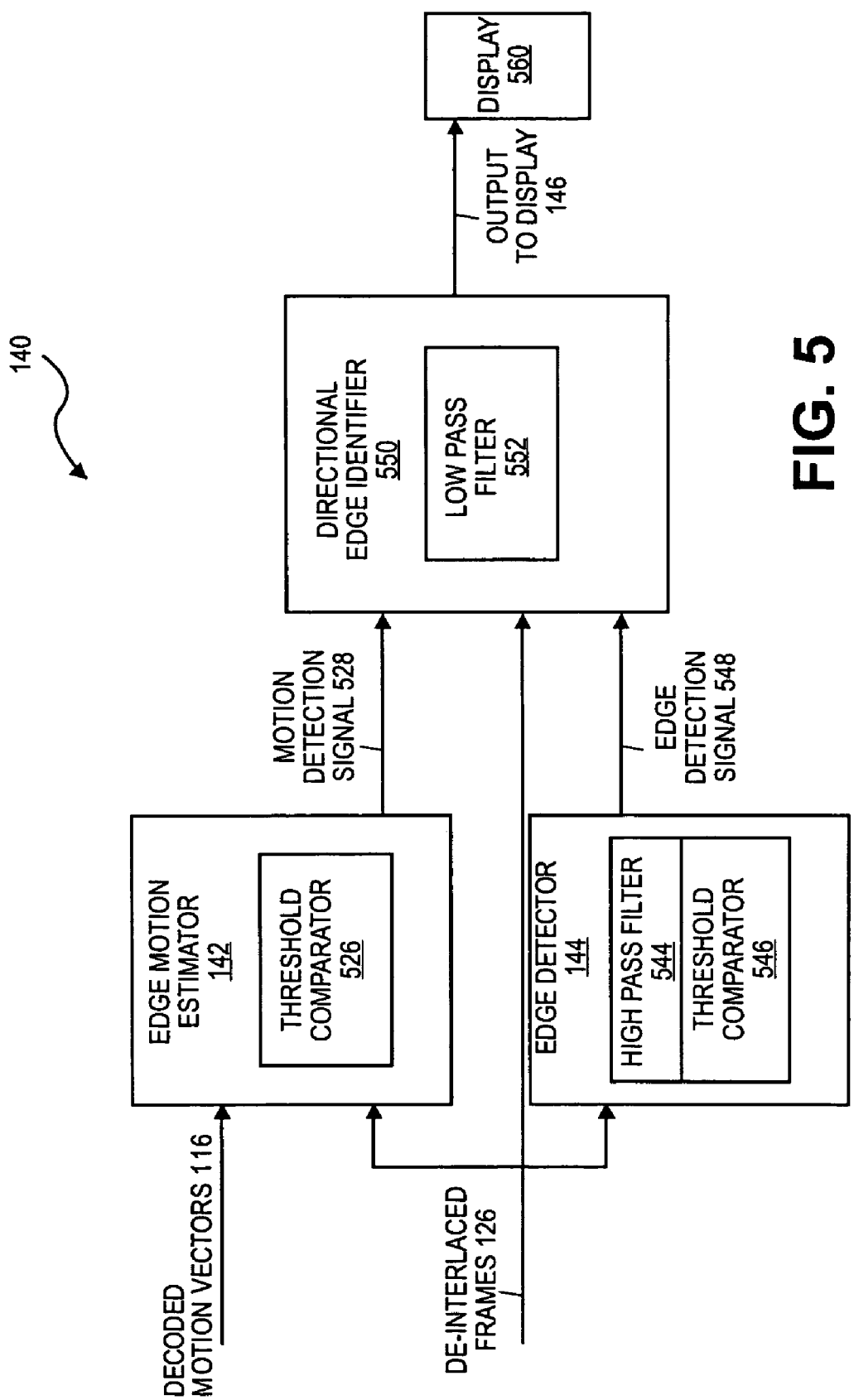
FIG. 5 is a block diagram of an edge interpolator for edge identification, in accordance with one embodiment.

As shown in FIG. 3, de-interlaced frames 126, such as frames including pixels having output pixel intensity 450, are received by edge interpolator 140. For example, FIG. 5 is a block diagram of an edge interpolator for edge identification, in accordance with one embodiment. FIG. 5 shows edge interpolator 140 having edge motion estimator 142, edge detector 144, and directional edge identifier 550 receiving de-interlaced frames 126. Edge motion estimator 142 also receives motion vectors 116, and includes threshold comparator 526. Edge detector 144 includes high pass filter 544 and threshold comparator 546. Directional edge identifier 550 receives motion detection signal 528 from edge motion estimator 142 and edge detection signal 548 from edge detector 144. Directional edge identifier 550 includes low pass filter 552 and output to display 146. FIG. 5 shows output to display 146 going to display 560.

Motion estimator 142 may provide motion segmentation, and may identify de-interlaced blocks of pixels of de-interlaced frames 126 having moving objects or images. Such moving object or images may be characterized by moving groups or sets of pixels. For example, for a de-interlaced block of pixels, motion estimator 142 may consider, use, or base a determination on motion vector 348 of the current block 342 to identify that the de-interlaced block of pixels has a moving set of pixels (e.g., such as a set of pixels that are part of a moving image). This motion vector may be compared with a selected threshold value using threshold comparator 526 to determine or detect whether the de-interlaced block includes a portion of a moving set of pixels, object or image. The determination of whether the de-interlaced block has a moving object or image is output to directional edge identified 550 by motion detection signal 528.

Edge detector 144 locates or identifies edges, such as diagonal edges, of a de-interlaced block of pixels of de-interlaced frames 126. For instance, edge detector 144 combs, edge segments, or prunes the de-interlaced block of pixels using high pass filter 544 and compares the results with a selected threshold using threshold comparator 546 to determine whether an edge, such as a diagonal edge of an object or image exists in the de-interlaced block of pixels. Edge detector 144 outputs the determination of whether or not the edge exists to directional edge identified 550 using edge detection signal 548.

If either motion detection signal 528 or edge detection signal 548 indicates that no edge is detected or no motion is detected, directional edge identifier 550 may output the current de-interlaced block as part of a de-interlaced frame of de-interlaced frames 126 to output to display 146. On the other hand, if motion is detected by edge motion estimator 142 and an edge is detected by edge detector 144 (e.g., such as a diagonal edge) directional edge identifier 550 interpolates or identifies a plurality of proper light intensities of edge pixels of the edge of the moving object or image in the de-interlaced block of pixels as part of a de-interlaced frame of de-interlaced frames 126 to output, to display 146.

For example, directional edge identifier 550 may consider light intensities of one or more pixels adjacent to or within one or two pixels of a pixel at or near a detected moving edge in order to interpolate, identify, generate, or calculate proper light intensities of edge pixels of an edge, such as a diagonal edge. More particularly, as shown in FIG. 5, directional edge identifier 550 includes low pass filter 552 to low pass filter light intensities of two or more adjacent pixels of a de-interlaced block of pixels of de-interlaced frames 126 in order to smooth, "fuzz", or identify proper light intensities of edge pixels of a moving edge (e.g., such as a moving diagonal edge) detected by motion estimator 142 and edge detector 144. Directional edge identifier 550 outputs, as part of a de-interlaced frame, the de-interlaced block having the identified or interpolated proper edge pixel light intensities, to output to display 146.

Thus, output to display 146 may include de-interlaced frames having de-interlaced blocks of pixels that have pixels with light intensities that are not interpolated or further identified by identifier 550, that are interpolated or further identified by identifier 550, or a mixture of blocks thereof. Output to display 146 is provided to display 560 for display. Display 560 may include scalers, frame buffers, and other video display technology to process de-interlaced frames of video for display on display 146. Specifically, edge interpolator 140 may identify moving diagonal edge pixels of a moving set of pixels as described above for moving objects or images.

Figure 6:
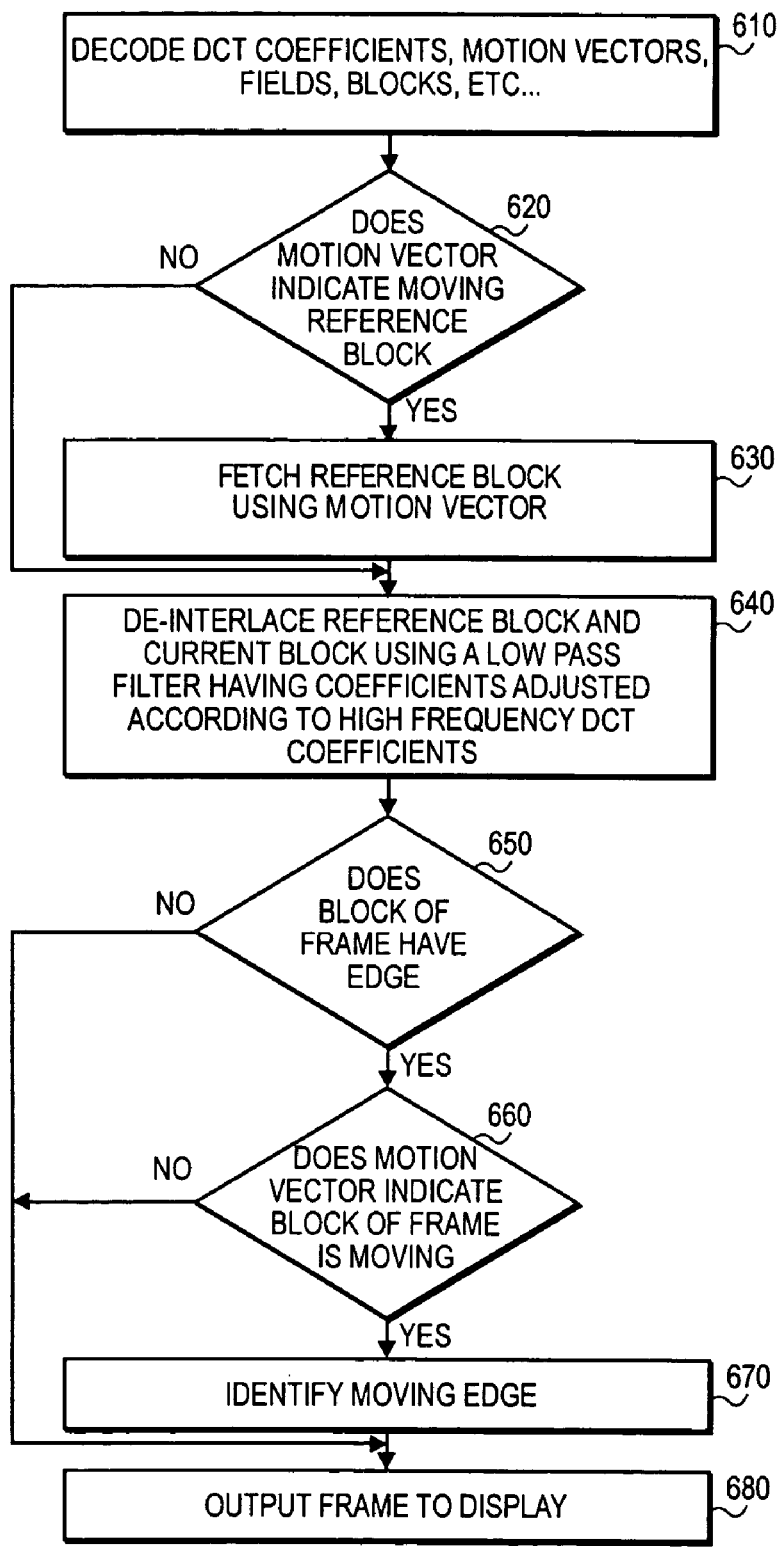
FIG. 6 is a flow diagram of a process for de-interlacing using decoded parameters of digital video.

FIG. 6 is a flow diagram of a process for de-interlacing using decoded parameters of digital video. At block 610, DCT coefficients, motion vectors, fields, blocks, MC parameters, MC decisions, and other coded information of a coded interlaced digital video data input are decoded. Block 610 may correspond to descriptions above for decoder 110.

At decision block 620, it is determined whether the motion vector for the reference block indicates that the reference block is moving. Block 620 may correspond to descriptions above with respect to calculator 122, motion calculator 227, motion vectors 116, and the pixel block selector for selecting pixel blocks of the fields to be processed by adaptive de-interlacer 120.

If at decision block 620 the reference block is not indicated as moving, process continues to block 640. If at decision block 620 the reference block is moving, processing continues to block 630. At block 630, the reference block is fetched using the motion vector of the current block. This fetched reference block may be considered a "motion compensated" reference block, according to the motion vector. Also, this fetched reference block may be considered to have a "computed" or "calculated" location, according to the motion vector. For example, referring to FIG. 3, reference block 322 may be fetched by using motion vector 348 of current block 342. Block 630 may correspond to descriptions above with respect to calculator 122, motion calculator 227, motion vectors 116, block 342, and motion vector 348.

Whether or not the reference block is motion compensated, at block 640, the reference block, and the current block, are de-interlaced using a low pass filter having coefficients adjusted according to high frequency DCT coefficients for the current block. For example, referring to FIG. 3, reference block, 322, and current block, 342, may be de-interlaced using a low pass filter having coefficients adjusted according to high frequency DCT coefficients for current block 342. Block 640 may correspond to descriptions above with respect to low pass filter 124, vertical temporal filter 420, output pixel intensity 450, de-interlaced frame 350, and de-interlaced block 352 (e.g., the output block).

At block 650, it is determined whether a de-interlaced block of the de-interlaced frame has an edge. If at block 650 the de-interlaced frame has an edge, such as a diagonal edge, processing continues to block 660. If at block 650, it is not determined that the de-interlaced block has an edge, processing continues to block 680. Block 650 may correspond to descriptions above with respect to edge detector 144, edge interpolator 140, high pass filter 544, threshold comparator 546, and edge detection signal 548.

At decision block 660, it is determined whether the motion vector for the reference block indicates that the de-interlaced block of the de-interlaced frame is moving. If at block 660 it is determined that the de-interlaced block is moving, process continues to block 670. If at block 660 it is determined that the de-interlaced block is not moving, processing continues to block 680. Block 660 may correspond to descriptions above with respect to edge motion estimator 142, edge interpolator 140, threshold comparator 526, and motion detection signal 528. It is considered that the order of blocks 650 and 660 may be reversed.

At block 670, the moving edge is identified or interpolated. Block 670 may correspond to descriptions above with respect to edge interpolator 140, directional edge identifier 550, low pass filter 552, and output to display 146.

At block 680, the de-interpolated blocks and de-interpolated frames are output to the display. For example, block 680 may correspond to descriptions above with respect to edge interpolator 140, directional edge identifier 550, output to display 146, and display 560. Thus, as shown in FIG. 6, the moving edge of an object or image in the de-interlaced pixel block, only needs to be interpolated or have its edge pixels properly identified at block 670 if an edge, such as a diagonal edge, is detected at block 650, and movement is detected at block 660. Otherwise, the de-interlaced block may be output or combined with other blocks to form the de-interlaced frame, without interpolating or identifying edges of objects or images within the de-interlaced block.

In the foregoing specification, specific embodiments are described. However, various modifications and changes may be made thereto without departing from the broader spirit and scope of embodiments as set forth in the claims. The specification and drawings are, accordingly, to be regarded in an illustrative rather than a restrictive sense.

What is claimed is:

1. An apparatus comprising:
   an adaptive de-interlacer to form a plurality of de-interlaced frames from a plurality of interlaced fields decoded from an interlaced video stream, the adaptive de-interlacer including:
   a motion compensator having a plurality of registers to move a location of a plurality of reference blocks of pixels of the interlaced fields using a plurality of motion vectors decoded from the interlaced video stream;
   a low pass digital filter to de-interlace a plurality of moved reference blocks of pixels and a plurality of current blocks of pixels decoded from the interlaced video stream, wherein the low pass digital filter includes a plurality of low pass digital filter coefficients adjustable according to a plurality of discrete cosine transform (DCT) high frequency coefficients decoded from the interlaced video stream, wherein the adaptive de-interlacer includes a motion vector extractor to extract the motion vectors, and a decoder to decode the DCT high frequency coefficients for the fields, and a map constructor to construct map of the motion vectors for the fields, wherein the low pass digital filter includes a temporal vertical filter to filter a plurality of pixels from the reference block and the current block, wherein the plurality of pixels are vertically aligned in location.

2. The apparatus of claim 1, further comprising a pixel block selector having a threshold comparator to select pixel blocks of the interlaced fields, where a location of the selected pixel block in the interlaced fields is calculated by the motion compensator according to the motion vectors.

3. A system comprising:

a processor;

a memory to store an application program to be executed by the processor;

a device including:

a decoder to decode a plurality of interlaced video fields, a plurality of motion vectors, and a plurality of discrete cosine transform (DCT) high frequency coefficients from a coded interlaced digital video stream;

an adaptive de-interlacer to form a plurality of de-interlaced frames from the plurality of interlaced video fields, the adaptive de-interlacer including:

a motion compensator to calculate the location of a plurality of reference blocks of pixels of the interlaced video fields using the motion vectors;

a first low pass digital filter to de-interlace a plurality of reference blocks of pixels and a plurality of current blocks of pixels using a plurality of low pass digital filter coefficients adjustable according to the DCT high frequency coefficients wherein the first low pass digital filter includes an adaptive video filter to vertically and temporally filter the fields into the frames;

an edge interpolator to identify diagonal edges of a moving image in a block of pixels of a de-interlaced frame, the edge interpolator including:

an edge motion estimator to detect a block of pixels of a de-interlaced frame having a moving set of pixels using motion vectors;

an edge detector to find at least one diagonal edge of the moving set of pixels using a digital high pass filter; and a directional edge identifier to identify a plurality of proper edge pixels of the diagonal edge of the moving set of pixels using a second digital low pass filter to smooth the pixels of the diagonal edge.

4. A machine-accessible storage medium having computer executable instructions that, when executed, cause a machine to:

motion compensate a location of a plurality of reference blocks of pixels of a plurality of interlaced video fields decoded from a coded interlaced digital video stream according to a plurality of decoded motion vectors of the reference blocks;

adjust a plurality of low pass digital filter coefficients according to a plurality of discrete cosine transform (DCT) high frequency coefficients decoded from the coded interlaced digital video stream;

de-interlace the plurality of motion compensated reference blocks of pixels and a plurality of current blocks of pixels decoded from the coded interlaced digital video stream using the low pass filter;

compare a threshold value to the plurality of motion vectors to detect a block of pixels of having a moving object, the block of pixels from a de-interlaced frame of pixels de-interlaced from the plurality of motion compensated reference blocks of pixels and the plurality of current blocks of pixels;

high pass filter the block of pixels o-f-having a moving object to identify at least one diagonal edge of the moving image; and then low pass filter the at least one diagonal edge to smooth a plurality of proper edge pixels of the edge;

extract the motion vectors;

decode the DCT high frequency coefficients for the fields; and map the motion vectors for the fields.

5. The machine-accessible storage medium of claim 4, wherein the motion vectors include information decoded from a plurality of codes of the interlaced digital video stream, where the codes were previously generated by a video encoder by comparing a location of a first block of pixels of an input video stream as compared to a second prior block of pixels of the stream having a portion of an object contained in the first block.

* * * * *

UNITED STATES PATENT AND TRADEMARK OFFICE
CERTIFICATE OF CORRECTION

PATENT NO. : 7,587,091 B2  Page 1 of 1
APPLICATION NO. : 10/976460
DATED : September 8, 2009
INVENTOR(S) : Loukianov et al.

It is certified that error appears in the above-identified patent and that said Letters Patent is hereby corrected as shown below:

In column 12, at line 27 after pixels delete, "o-f-"

Signed and Sealed this

Fifteenth Day of June, 2010

David J. Kappos
*Director of the United States Patent and Trademark Office*